(12) United States Patent
Ando et al.

(10) Patent No.: US 8,104,947 B2
(45) Date of Patent: Jan. 31, 2012

(54) CONCRETE AGITATING DRUM DRIVING DEVICE

(75) Inventors: Kunihiro Ando, Tokyo (JP); Masaya Abe, Tokyo (JP); Yoshihito Iwasaki, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 578 days.

(21) Appl. No.: 12/309,355

(22) PCT Filed: Jul. 13, 2007

(86) PCT No.: PCT/JP2007/064382
§ 371 (c)(1),
(2), (4) Date: Jan. 15, 2009

(87) PCT Pub. No.: WO2008/013123
PCT Pub. Date: Jan. 31, 2008

(65) Prior Publication Data
US 2009/0282824 A1    Nov. 19, 2009

(30) Foreign Application Priority Data
Jul. 25, 2006  (JP) ................... 2006-202092

(51) Int. Cl.
*B28C 5/18* (2006.01)
(52) U.S. Cl. .............. 366/54; 366/61; 60/452
(58) Field of Classification Search ........... 366/54, 366/61; 60/452
See application file for complete search history.

(56) References Cited

U.S. PATENT DOCUMENTS

| 3,603,084 | A | * | 9/1971 | Okazaki | 60/389 |
| 4,097,925 | A | * | 6/1978 | Butler, Jr. | 366/2 |
| 4,722,187 | A | * | 2/1988 | Maul et al. | 60/433 |
| 5,067,740 | A |   | 11/1991 | Christenson | |

FOREIGN PATENT DOCUMENTS

| JP | U57-105710 | 6/1982 |
| JP | 2000-153768 | 6/2000 |
| JP | 2000-272405 | 10/2000 |
| JP | 2000-272406 | 10/2000 |
| JP | U60-150013 | 10/2005 |
| TW | 219015 | 1/1994 |
| TW | 222097 | 4/1994 |

* cited by examiner

*Primary Examiner* — Joseph Del Sole
*Assistant Examiner* — James Sanders
(74) *Attorney, Agent, or Firm* — Rabin & Berdo, PC (57) ABSTRACT

A concrete agitating drum (1) is driven by a hydraulic motor (81). A connection switch-over valve (20) is arranged to have a function to regulate a flow cross-sectional area of pressurized working oil supplied to the hydraulic motor (81) from a variable capacity hydraulic pump (10). The variable capacity hydraulic pump (10) is driven by a combustion engine (60) together with a charge pump (11). When a discharge pressure of the charge pump (11) is low, the connection switch-over valve (20) maintains a small flow cross-sectional area to rotate the agitating drum (1) at a low rotation speed so that fuel consumption of the combustion engine (60) is suppressed to be small. When the discharge pressure of the charge pump (11) becomes high, the connection switch-over valve (20) enlarges the flow cross-sectional area, thereby realizing a rated rotation speed of the agitating drum (1).

12 Claims, 11 Drawing Sheets

CONCRETE AGITATING DRUM DRIVING DEVICE

FIELD OF THE INVENTION

This invention relates to an agitating drum driving device for a concrete agitating truck using a variable capacity hydraulic pump and a hydraulic motor.

BACKGROUND OF THE INVENTION

A ready-mixed concrete agitating truck is equipped with a concrete agitating drum for agitating and discharging ready-mixed concrete supplied from a hopper or the like. The agitating drum is driven by a hydraulic motor.

JP2000-272405A, published by the Japan Patent Office in 2000, proposes a hydraulic drive circuit for such a concrete agitating drum.

In this hydraulic drive circuit, the hydraulic motor is supplied with pressurized oil from a variable capacity hydraulic pump via a connection switch-over valve. The connection switch-over valve has a function to select a direction in which the pressurized oil discharged from the variable capacity hydraulic pump is supplied to the hydraulic motor as well as to shut off supply of the pressurized oil to the hydraulic motor. The concrete agitating drum rotates in a normal direction or a reverse direction according to an operation of the connection switch-over valve by an operator of the ready-mixed concrete agitating truck. Further, the concrete agitating drum stops rotating when the operator switches the connection switch-over valve to an operation-stop section.

The variable capacity hydraulic pump varies a pump discharge flow rate in response to an action of an actuator. The actuator is responsive to a discharge pressure of the pump. A load sensing valve regulates the pump discharge pressure and supplies a regulated pressure to the actuator, thereby maintaining a differential pressure between the discharge pressure of the hydraulic pump and a load pressure of the hydraulic motor at a constant value. Keeping the differential pressure constant means that the flow rate of the pressurized oil supplied from the hydraulic pump to the hydraulic motor is maintained at a constant flow rate. As a result, even when the rotation speed of the hydraulic pump, which is driven by an internal combustion engine, varies, the rotation speed of the agitating drum does not vary.

SUMMARY OF THE INVENTION

However, it is difficult to maintain the discharge flow rate of the hydraulic pump at a constant flow rate throughout the engine rotation speed range from an idle rotation speed region to a high rotation speed region simply by varying the capacity of the variable capacity hydraulic pump.

In order to maintain the pump discharge flow rate of the hydraulic pump at a constant flow rate, it may be necessary to regulate an output torque of the internal combustion engine. For example, within a range from the idle rotation speed region to a low rotation speed region, it may be necessary to increase a fuel supply amount to the internal combustion engine to input a sufficient rotating torque into the hydraulic pump in which the discharge amount of pressurized working oil per unit rotation has been increased. However, engine control of this kind increases the fuel consumption amount of the internal combustion engine.

It is therefore an object of this invention to reduce a fuel consumption amount of an internal combustion engine which is used as a power source for driving a concrete agitating drum for ready-mixed concrete.

In order to achieve the above object, this invention provides a concrete agitating drum driving device comprising a hydraulic motor mechanically connected to a concrete agitating drum, a variable capacity hydraulic pump driven by a combustion engine to drive the hydraulic motor to rotate by supplying pressurized working oil, the variable capacity hydraulic pump comprising a discharge passage to which the variable capacity hydraulic pump discharges the pressurized working oil which is to be supplied to the hydraulic motor, a mechanism which varies a capacity of the variable capacity hydraulic pump to maintain a pump discharge flow rate of the pressurized working oil discharged into the discharge passage by the variable capacity hydraulic pump constant, a charge pump which rotates in synchronization with the variable capacity hydraulic pump and discharges working oil which is to be suctioned by the variable capacity hydraulic pump, and a valve which narrows a flow cross-sectional area of the pressurized working oil supplied from the discharge passage to the hydraulic motor as a discharge pressure of the charge pump decreases.

The details as well as other features and advantages of this invention are set forth in the remainder of the specification and are shown in the accompanying drawings.

DESCRIPTION OF THE PREFERRED EMBODIMENTS

Figure 1A:
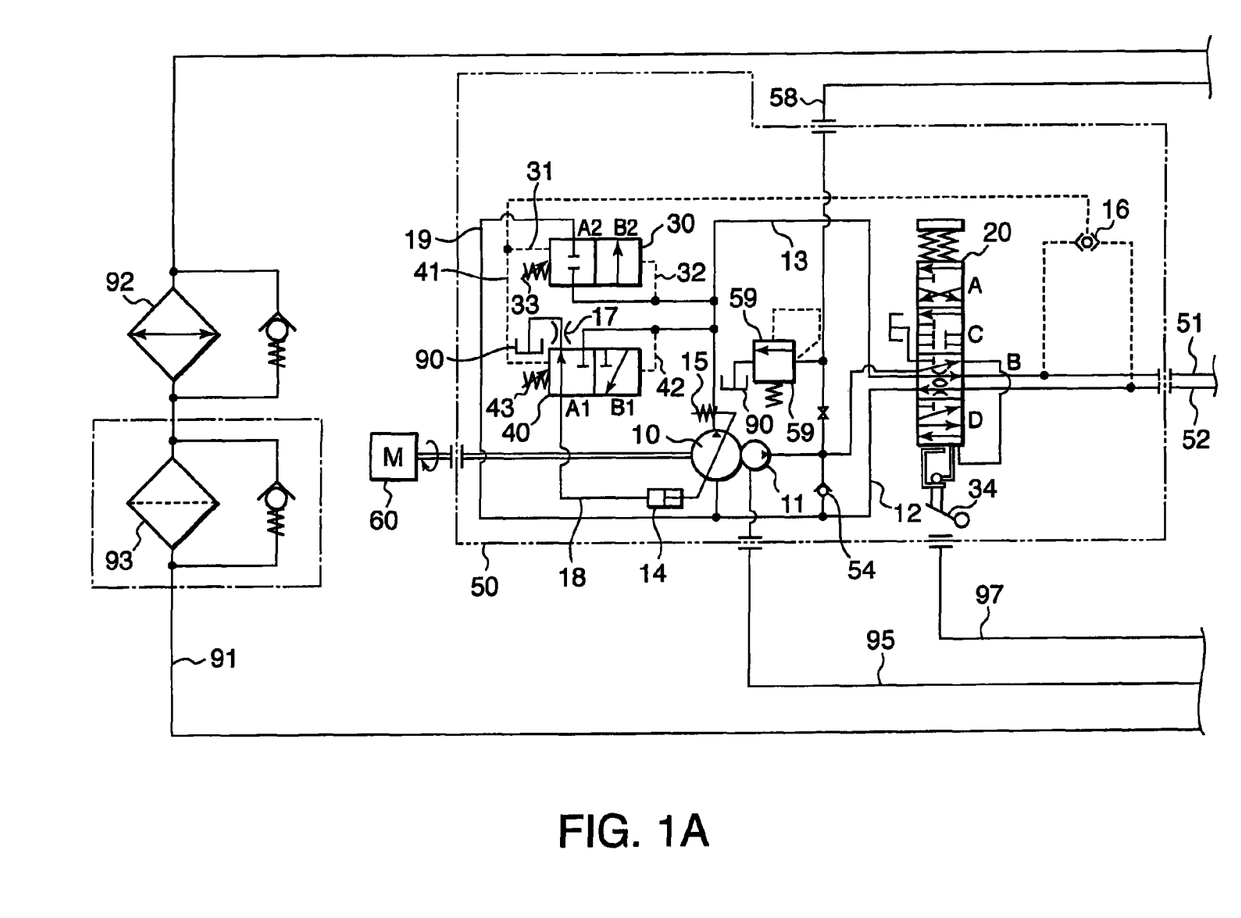
FIGS. 1A and 1B are a hydraulic circuit diagram of a concrete agitating drum driving device according to this invention.
Figure 1B:
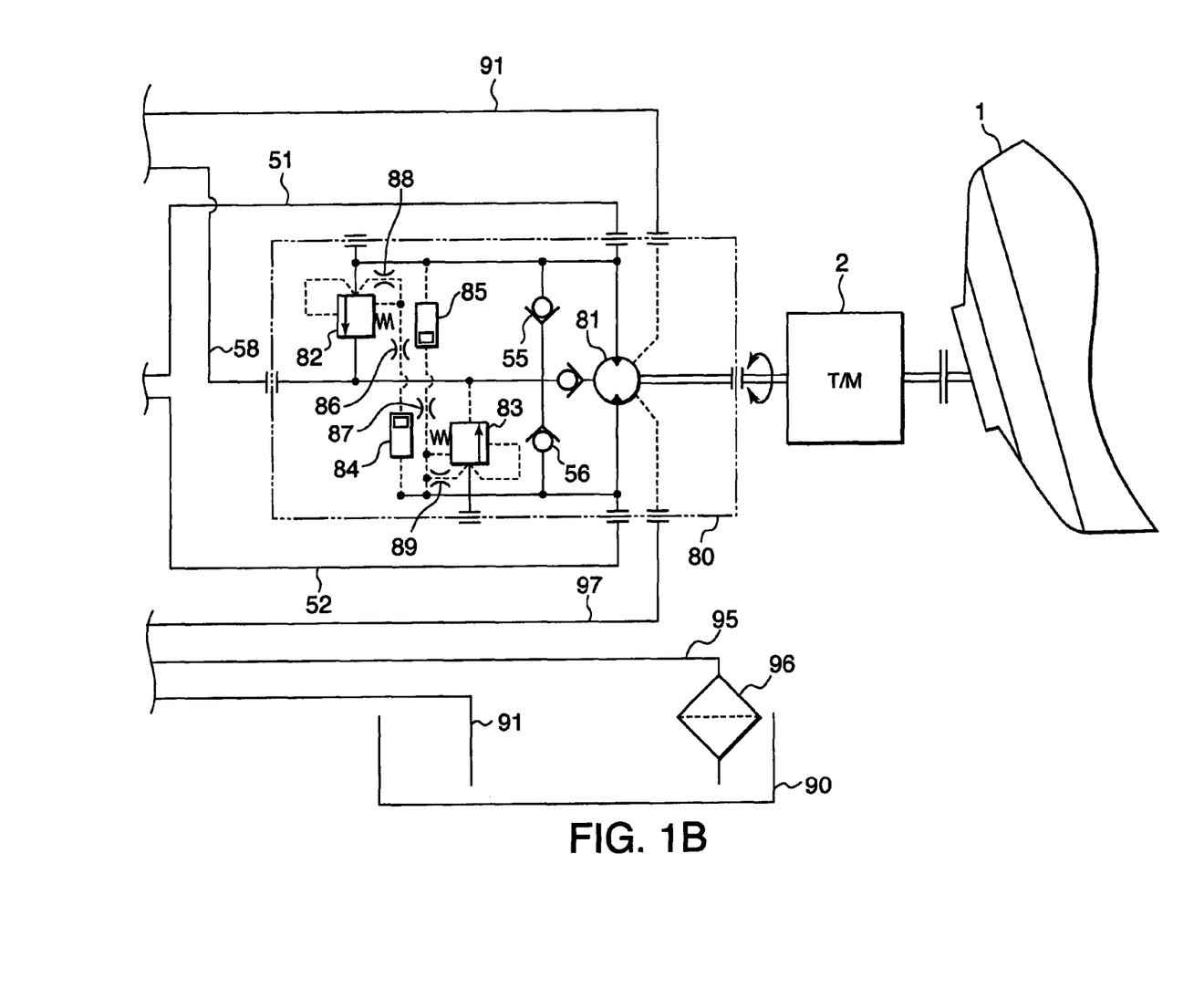

Referring to FIGS. 1A and 1B of the drawings, a concrete agitating drum driving device for a ready-mixed concrete agitating truck comprises a pump unit 50, a motor unit 80, a reservoir 90, and hydraulic passages connecting these units and the reservoir.

The motor unit 80 comprises a hydraulic motor 81 which rotates a concrete agitating drum 1 via a transmission 2.

The hydraulic motor 81 comprises two ports to which a first hydraulic passage 51 and a second hydraulic passage 52 are connected respectively. The hydraulic motor 81 rotates in a normal direction and a reverse direction according to a hydraulic pressure supplied selectively to the first hydraulic passage 51 and the second hydraulic passage 52.

A relief valve 82 is connected to the first hydraulic passage 51. A pressure in the first hydraulic passage 51 is input into the relief valve 82 as a pilot pressure to open the relief valve 82. A pressure in the second hydraulic passage 52 is input into the relief valve 82 via a piston unit 84 and an orifice 86 as a pilot pressure to close the relief valve 82. The pressure in the first hydraulic passage 51 is also input to the relief valve 83 via an orifice 87 as another pilot pressure to close the relief valve 82. In response to variation in these pilot pressures, the relief valve 82 opens when the pressure in the first hydraulic passage 51 increases rapidly with respect to the pressure in the second hydraulic passage 52 such that a part of the working oil in the first hydraulic passage 51 is released into a charging passage 58, and closes after a while. The relief valve 82 thereby absorbs a shock which the hydraulic motor 81 may encounter due to the rapid increase in the pressure in the first hydraulic passage 51.

A relief valve 83 is connected to the second hydraulic passage 52. A pressure in the second hydraulic passage 52 is input into the relief valve 83 as a pilot pressure to open the relief valve 83. A pressure in the first hydraulic passage 51 is input into the relief valve 83 via a piston unit 85 and an orifice 87 as a pilot pressure to close the relief valve 83. A pressure in the second hydraulic passage 52 is also input into the relief valve 83 via an orifice 89 as another pilot pressure to close the relief valve 83. In response to variation in these pilot pressures, the relief valve 83 opens when the pressure in the second hydraulic passage 52 increases rapidly with respect to the pressure in the first hydraulic passage 51 such that a part of the working oil in the second hydraulic passage 52 is released into the charging passage 58, and closes after a while. The relief valve 83 thereby absorbs a shock which the hydraulic motor 81 may encounter due to the rapid increase in the pressure in the second hydraulic passage 52.

To summarize the above, the relief valves 82 and 83 provide a function generally known as a shock-less structure.

The charging passage 58 is connected to the first hydraulic passage 51 via a check valve 55. The charging passage 58 is also connected to the second hydraulic passage 52 via a check valve 56.

The interior of a casing of the motor unit 80 communicates with the reservoir 90 via a drain passage 91. An oil cooler 92 and an oil filter 93 are provided in the drain passage 91.

The pump unit 50 comprises a hydraulic pump 10 driven by an internal combustion engine 60, a charge pump 11, a relief valve 59, a connection switch-over valve 20, a load sensing valve 40, an unload valve 30, and a high pressure selector valve 16.

The charge pump 11 rotates in synchronization with the hydraulic pump 10 and supplies the charging passage 58 with working oil from the reservoir 90 via a passage 95. The working oil in the charging passage 58 has a function to fill the first hydraulic passage 51 via the check valve 55 and the second hydraulic passage 52 via the check valve 56.

The charging passage 58 communicates with the reservoir 90 via the relief valve 59. The relief valve 59 returns surplus working oil discharged form the charge pump 11 to the reservoir 90 when the pressure in the charging passage 58 rises above a predetermined relief pressure.

Working oil suctioned by the charge pump 11 is supplied from the reservoir 90 via the passage 95. A strainer 96 is provided in the passage 95. A casing of the pump unit 50 and a casing of the motor unit 80 communicate with each other via a drain passage 97.

A suction passage 12 and a discharge passage 13 are connected respectively to the hydraulic pump 10. The hydraulic pump 10 pressurizes working oil suctioned from the suction passage 12 and discharges pressurized oil into the discharge passage 13. The suction passage 12 is filled with the working oil supplied from the charge pump 11 via a check valve 54.

The first hydraulic passage 51 and the second hydraulic passage 52 are connected to the suction passage 12 and the discharge passage 13 via the connection switch-over valve 20. In other words, a closed hydraulic circuit is formed between the hydraulic motor 81 and the hydraulic pump 10.

The connection switch-over valve 20 has sections A-D which are basically switched by a manual operation of an operation lever 34 performed by an operator. In the discharge section A, the connection switch-over valve 20 connects the suction passage 12 to the first hydraulic passage 51 while connecting the discharge passage 13 to the second hydraulic passage 52. In the agitating section B or D, the connection switch-over valve 20 connects the discharge passage 13 to the first hydraulic passage 51 while connecting the suction passage 12 to the second hydraulic passage 52. In the operation-stop section C, the connection switch-over valve 20 shuts off the suction passage 12 and discharge passage 13 from the first hydraulic passage 51 and second hydraulic passage 52, respectively.

The connection switch-over valve 20 thereby switches the hydraulic motor 81 between normal rotation, reverse rotation, and rotation stop. The discharge section A is applied when the agitating drum 1 discharges ready-mixed concrete, and the agitating section B is applied when the agitating drum 1 agitates the ready-mixed concrete. The difference between the section B and the section D will be described in detail later.

A swash-plate type piston pump is used as the hydraulic pump 10. The hydraulic pump 10 comprises a hydraulic actuator 14 for varying a swash-plate angle. The hydraulic actuator 14 varies the swash-plate angle according to an actuator driving pressure supplied to an actuator passage 18 from the discharge passage 13 via the load sensing valve 40. The hydraulic actuator 14 is arranged to decrease the swash-plate angle as the actuator driving pressure increases.

The load sensing valve 40 has a low-pressure section A1 which connects the actuator passage 18 to the reservoir 90 via an orifice 17 and a high-pressure section B1 which connects the actuator passage 18 to the discharge passage 13. The load sensing valve 40 applies the low-pressure section A1 and the high-pressure section B1 in a proportion corresponding to a differential pressure between the pump discharge pressure in the discharge passage 13 and a load pressure acting on the hydraulic motor 81 which appears in either of the first hydraulic passage 51 and second hydraulic passage 52. In other words, the discharge pressure of the hydraulic pump 10 is reduced in response to the differential pressure and then supplied as the actuator driving pressure to the actuator passage 18.

It should be noted that the load pressure is a pressure exerted on the hydraulic motor 81 to rotate the agitating drum 1, and the differential pressure between the pump discharge pressure of the hydraulic pump 10 and the load pressure acting on the hydraulic motor 81 is proportional to the flow rate of the pressurized oil in the discharge passage 13.

For this purpose, the load sensing valve 40 comprises a spring 43 which applies a resilient force to the load sensing valve 40 in a direction for applying the low-pressure section A1. The load sensing valve 40 also comprises a first pilot pressure passage 41 which applies a pilot pressure on the load sensing valve 40 in the same direction as the resilient force of the spring 43, and a second pilot pressure passage 42 which applies a pilot pressure on the load sensing valve 40 in the reverse direction to the resilient force of the spring 43, or in other words in a direction for applying the high-pressure section B1.

The first pilot pressure passage 41 is connected to the first hydraulic passage 51 and the second hydraulic passage 52 via a high-pressure selector valve 16. The high-pressure selector valve 16 inputs the higher pressure of the hydraulic pressures in the first hydraulic passage 51 and the second hydraulic passage 52 into the first pilot pressure passage 41. In other words, the high-pressure selector valve 16 inputs the load pressure of the hydraulic motor 81 to the first pilot pressure passage 41. The second pilot pressure passage 42 is connected to the discharge passage 13. The high-pressure selector valve 16 may be constituted by a shuttle valve, for example.

According to the above construction, when the agitating drum 1 is rotated, the actuator 14 decreases the swash-plate angle of the hydraulic pump 10 as the differential pressure between the discharge pressure of the hydraulic pump 10 and the load pressure of the hydraulic motor 81 increases, and increases the swash-plate angle of the hydraulic pump 10 as the differential pressure decreases.

When the agitating drum 1 is to stop operating, the connection switch-over valve 20 is switched to the operation-stop section C so as to shut off the discharge passage 13 from the hydraulic motor 81. As a result, the discharge pressure of the hydraulic pump 10 increases rapidly, and the load sensing valve 40 comes to apply only the high-pressure section B1. Accordingly, the pump discharge pressure acts directly on the hydraulic actuator 14 and the hydraulic actuator 14 decreases the swash-plate angle of the hydraulic pump 10 towards zero, or in other words the hydraulic actuator 14 decreases the pump discharge flow rate of the hydraulic pump 10 towards zero.

The unload valve 30 has a function to release the discharged pressurized oil of the hydraulic pump 10 in the discharge passage 13 to the suction passage 12 when the differential pressure between the discharge pressure of the hydraulic pump 10 and the load pressure of the hydraulic motor 81 increases beyond a first predetermined differential pressure. The unload valve 30 is interposed in a bypass passage 19 connecting the discharge passage 13 and the suction passage 12.

The unload valve 30 has a loading section A2 which closes the bypass passage 19 and an unloading section B2 which opens the bypass passage 19 to connect the discharge passage 13 to the suction passage 12. The unload valve 30 is biased by a spring 33 in a direction for applying the loading section A2.

The unload valve 30 is provided with a first pilot pressure passage 31 which applies a pilot pressure to the unload valve 30 in the same direction as the biasing force of the spring 33. The unload valve 30 is also provided with a second pilot pressure passage 32 which applies a pilot pressure to the unload valve 30 in an opposite direction to the biasing force of the spring 33, or in other words in a direction for applying the unloading section B2.

The first pilot pressure passage 31 is connected to the first hydraulic passage 51 and the second hydraulic passage 52 via the high-pressure selector valve 16. The second pilot pressure passage 32 is connected to the discharge passage 13.

Figure 2:
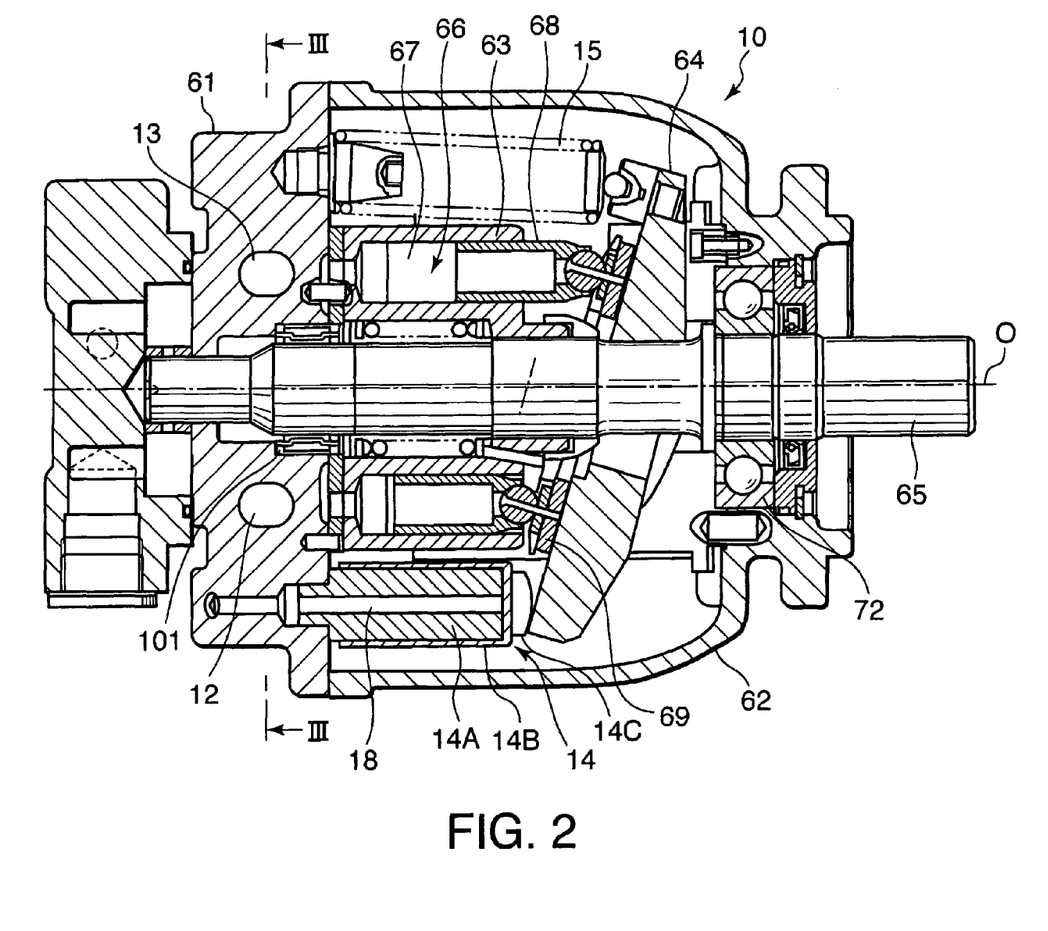
FIG. 2 is a longitudinal sectional view of a hydraulic pump with which the concrete agitating drum driving device is provided.

Referring to FIG. 2, the hydraulic pump 10 is a rotating swash-plate type hydraulic pump and comprises a cylinder block 63 and a swash-plate 64 which are enclosed in a space formed by a pump housing 62 and a pump cover 61 fixed thereto.

The cylinder block 63 is driven to rotate by a shaft 65. The shaft 65 is supported by the pump housing 62 via a bearing 102. A tip of the shaft 65 is supported by the pump cover 61 via a bearing 101. Another tip of the shaft 65 penetrates the pump housing 62 to the outside and is connected to the internal combustion engine 60.

A plurality of cylinders 66 are disposed in the cylinder block 63 in parallel with a center axis O of the shaft 65 and along a circle about the center axis O at regular intervals.

A piston 68 is inserted into each of the cylinders 66. A pressure chamber 67 is formed in the cylinder 66 by the piston 68. A tip of the piston 68 projects from the cylinder 66 in an axial direction and contacts the swash-plate 64 via a shoe 69. When the cylinder block 63 rotates, each of the pistons 68 is driven in the axial direction by the swash-plate 64 so as to expand/contract the pressure chamber 67 cyclically.

In order to make the pump discharge flow rate of the hydraulic pump 10 variable, the swash-plate 64 is supported by the pump housing 62 via a trunnion shaft so as to be free to gyrate about the trunnion shaft. A spring 15 disposed in the pump housing 62 supports the swash-plate 64 in a direction for increasing the swash-plate angle.

The actuator 14 is a linear actuator and comprises an inner tube 14A and a plunger 14C which is in contact with the swash-plate 64. The inner tube 14A is fixed to the pump cover 61 so as to be parallel with the center axis O of the shaft 65. The actuator passage 18 penetrates the center of the inner tube 14A in a direction along the center axis O. On the outer circumference of the inner tube 14A, an outer tube 14B which forms a base of the plunger 14C is fitted so as to be free to slide in the direction along the center axis O.

The pressure in the actuator passage 18 acts on the rear side of the plunger 14C from within the outer tube 14B. As a result, the plunger 14C pushes the swash-plate 64 towards the right-hand side in the figure to decrease the swash-plate angle against the resilient force of the spring 15. As the pressure in the actuator passage 18 increases, therefore, the swash-plate angle of the hydraulic pump 10 decreases.

Next, the construction of the connection switch-over valve 20 will be described.

The connection switch-over valve 20 comprises two agitating sections B and D as described above. Both of the agitating sections B and D connect the suction passage 12 to the second hydraulic passage 52 and connect the discharge passage 13 to first hydraulic passage 51. The section D provides a larger flow cross-sectional area than the section B with respect to working oil flow in any direction. In other words, in the section D, the flow rate of the pressurized working oil which drives the hydraulic motor 81 is greater than in the section B, and as a result, in the section D, the agitating drum 1 rotates at a higher rotation speed than in the section B. In the following description, the section B is named as a low-speed agitating section and the section D is named as a high-speed agitating section. The operating lever 34 switches only between the discharge section A, the operation-stop section C, and the low-speed agitating section B. Switching between the low-speed agitating section B and the high-speed agitating section D is performed automatically in the connection switch-over valve 20 in response to the discharge pressure of the charge pump 11.

The reason for providing the connection switch-over valve 20 with the low-speed agitating section B and the high-speed agitating section D is explained as follows.

It is difficult to maintain the hydraulic pump 10 at a constant pump discharge flow rate throughout the entire engine rotation speed region, ranging from the idle rotation speed to the highest rotation speed, simply by varying the capacity of the hydraulic pump 10

For example, if an attempt is made to achieve a constant pump discharge flow rate in the idle rotation speed region or the low rotation speed region of the internal combustion engine 60, an increase in an engine output torque of the internal combustion engine 60 may be inevitable The engine output torque cannot be increased without increasing the fuel consumption amount.

In this context, the connection switch-over valve 20 is arranged to suppress the flow rate of working oil in the first hydraulic passage 51 and the second hydraulic passage 52 when agitating ready-mixed concrete in a low rotation speed in the idle rotation speed region and the low rotation speed region of the internal combustion engine 60. As a result, the required output torque of the internal combustion engine 60 is kept small and an increase in the fuel consumption amount of the internal combustion engine 60 in the idle rotation speed region and the low rotation speed region is thereby prevented. It should be noted that the rotation speed of the agitating drum 1 when the connection switch-over valve 20 applies the low-speed agitating section B is lower than a rated rotation speed or a normal operation speed of the agitating drum 1.

When, on the other hand, the rotation speed of the internal combustion engine 60 increases, the discharge pressure of the charge pump 11 also increases. In the low-speed agitating section B and the high-speed agitating section D of the connection switch-over valve 20, the discharge pressure of the charge pump 11 biases the connection switch-over valve 20 in a direction for applying the high-speed agitating section D. As the discharge pressure of the charge pump 11 increases, the proportion of application of the high-speed agitating section D with respect to application of the low-speed agitating section B increases, and accordingly the rotation speed of the agitating drum 1 increases. Thus, when the rotation speed of the internal combustion engine 60 becomes equal to or greater than a predetermined rotation speed, the rotation speed of the agitating drum 1 reaches the rated rotation speed or the normal operation speed. The predetermined rotation speed of the internal combustion engine 60 is set to 600-800 revolutions per minute (rpm), for example.

Figure 3:
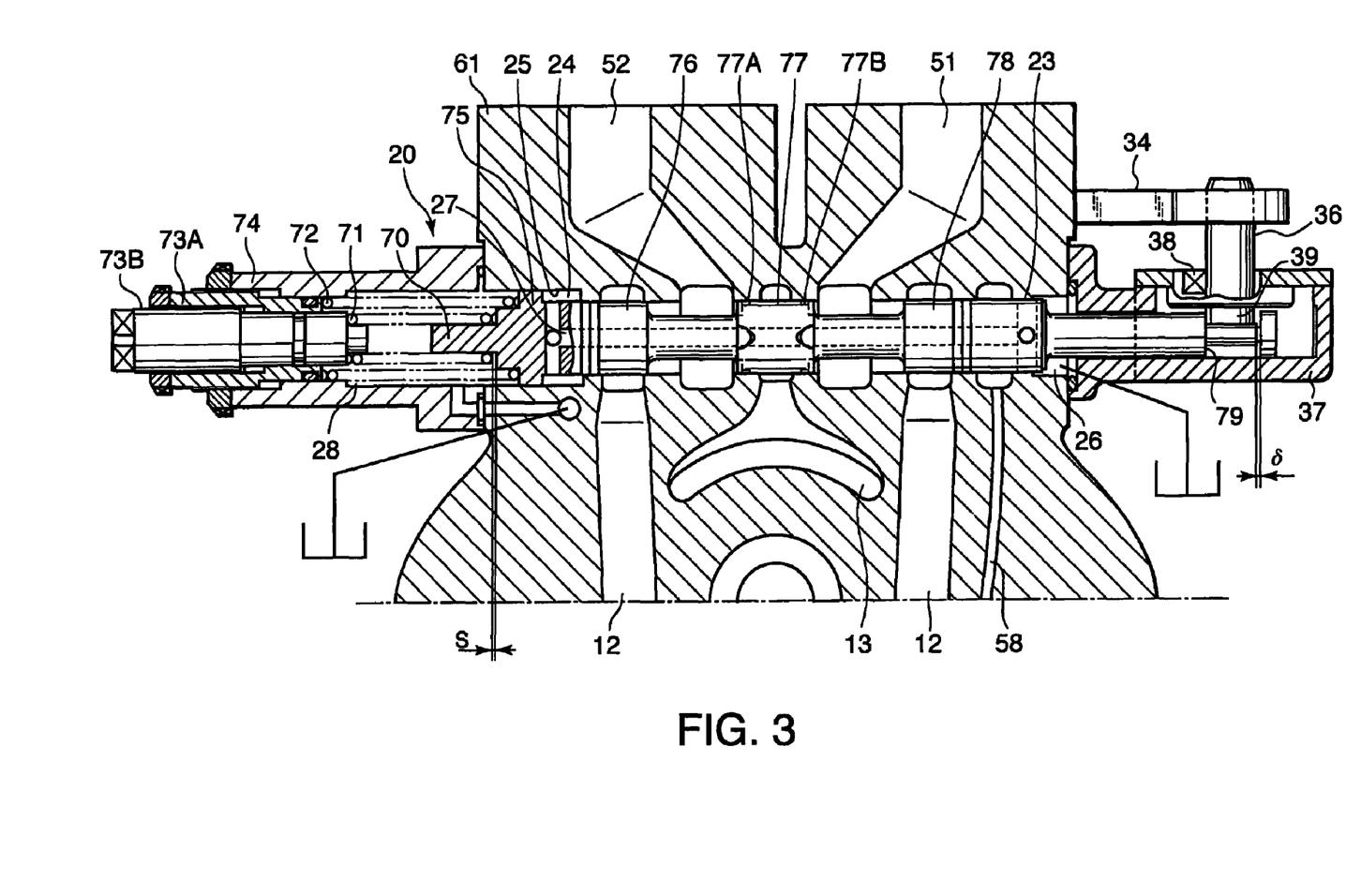
FIG. 3 is a cross-sectional view of a pump cover of the hydraulic pump taken along a line III-III in FIG. 2, showing a connection switch-over valve in an operation-stop section

Referring to FIG. 3, the main portion of the connection switch-over valve 20 is located in the pump cover 61 of the hydraulic pump 10. The suction passage 12 and the discharge passage 13 are formed in the pump cover 61. As the cylinder block 63 rotates in the hydraulic pump 10, working oil is aspirated from the suction passage 12 into each of the pressure chambers 67 in an elongation stroke of the piston 68, and pressurized working oil is discharged from each of the pressure chambers 67 to the discharge passage 13 in a contraction stroke of the piston 68. The first hydraulic passage 51 and the second hydraulic passage 52 are also led to the interior of the pump cover 61.

The connection switch-over valve 20 comprises a valve spool 70 fitted into a valve hole 23 that penetrates the pump cover 61.

On the inner circumference of the valve hole 23, annular grooves which communicate with the suction passage 12, the discharge passage 13, the first hydraulic passage 51, the second hydraulic passage 52, and the charging passage 58, respectively, are formed respectively. The valve spool 70 comprises three land portions 76, 77, and 78. The land portions 76, 77, and 78 respectively communicate with or shut off two of the annular grooves according to a stroke position of the valve spool 70 in an axial direction. Notches 77A and 77B are formed on both ends of the land portion 77.

A pin 36 is fixed to an end of the operating lever 34. The pin 36 is supported by a casing 37 attached to the pump cover 61 via a bearing 38 so as to be free to rotate. A cam 39 is formed on a tip of the pin 36. An end of the valve spool 70 projects to the exterior of the pump cover 61 from the valve hole 23. An annular groove 79 is formed on the outer circumference of the projecting tip of the valve spool 70 so as to engage with the cam 39. When the pin 36 is rotated by the operating lever 34, the cam 39 pushes one of the two parallel wall surfaces forming the annular groove 79 so as to move the valve spool 70 in an axial direction.

A drain chamber 26 facing a side face of the land portion 78 which faces the right hand side in FIG. 3 is formed in the valve hole 23. The drain chamber 26 communicates with the interior of the pump housing 2. The interior of the drain chamber 26 is maintained at a drain pressure which is equal to the pressure of the reservoir 90.

A piston part 75 is formed on the other end of the valve spool 70 which corresponds to the left hand side of the valve spool 70 in the figure and projects from the valve hole 23 to the exterior of the pump cover 61. A casing 74 is attached to the pump cover 61 so as to accommodate the other end of the valve spool 70. In the interior of the pump cover 61 and the casing 74, a cylinder part 25 having a larger diameter than the valve hole 23 is formed so as to be continuous with the valve hole 23. The piston part 75 is fitted into the inner circumference of the cylinder part 25. A pilot pressure chamber 24 is formed in the cylinder part 25 facing the piston part 75. A charging pressure in the charging passage 58 is led to the pilot pressure chamber 24 as a pilot pressure. This pilot pressure acts on the valve spool 70 in the pilot pressure chamber 24 so as to push the valve spool 70 via the piston part 75 in a left hand direction in the figure.

An axial hole 27 is formed axially through a center portion of the valve spool 70. The valve spool 70 in the figure is located in the operation-stop section C. In the operation-stop section C, the pilot pressure chamber 24 and the drain chamber 26 communicate with each other via the axial hole 27.

A first return spring 71 and a second return spring 72 in a coil-shape are enclosed in a spring chamber 28 serving as a part of the cylinder part 25 and located on the opposite side of the pilot pressure chamber 24 to the piston part 75. The drain pressure is led into the spring chamber 28 from the pump housing 62. The first return spring 71 and the second return spring 72 bias the valve spool 70 towards the discharge section A, or in a right hand direction in the figure.

It should be noted that the first return spring 71 exerts a spring force on the valve spool 70 only when the valve spool 70 is located in the agitating section B or D, whereas the second return spring 72 always exerts a spring force on the valve spool 70 irrespective of the stroke position thereof.

The first return spring 71 is gripped between the valve spool 70 and a first adjusting screw 73B. The second return spring 72 is gripped between the valve spool 70 and a second adjusting screw 73A. The first adjusting screw 73B is screwed into a cylindrical hollow portion formed in the second adjusting screw 73A. The second adjusting screw 73A is screwed into an inner circumference of the casing 74.

By altering a screwed position of the second adjusting screw 73A in the casing 74, the spring forces of the first return spring 71 and the second return spring 72 can be adjusted. Further, by altering a screwed position of the first adjusting screw 73B in the second adjusting screw 73A, the spring force of the first return spring 71 can be adjusted independently of the spring force of the second return spring 72.

It is also possible to use a single spring or three or more springs instead of the first return spring 71 and the second return spring 72 as a return spring for biasing the valve spool 70 towards the discharge section A.

The valve spool 70 moves axially according to an operation of the operating lever 34, whereby the discharge section A, the operation-stop section C, and the agitating section B are applied selectively. The operating lever 34 is maintained in each operation position by a detent mechanism until the operating lever 34 is operated again.

In a state where the valve spool 70 is maintained in the operation-stop section C by the operating lever 34, the connection switch-over valve 20 shuts off the suction passage 12 and the discharge passage 13 from the first hydraulic passage 51 and the second hydraulic passage 52.

The discharge section A corresponds to a position where the valve spool 70 is displaced a predetermined distance from the operation-stop section C in the right hand direction in the figure by the operation of the operating lever 34. In the discharge section A, the connection switch-over valve 20 connects the suction passage 12 to the first hydraulic passage 51, and connects the discharge passage 13 to the second hydraulic passage 52 via the notch 77A formed on the land portion 77. In the discharge section A, the hydraulic motor 81 rotates the agitating drum 1 in a direction for discharging ready-mixed concrete.

Figure 4:
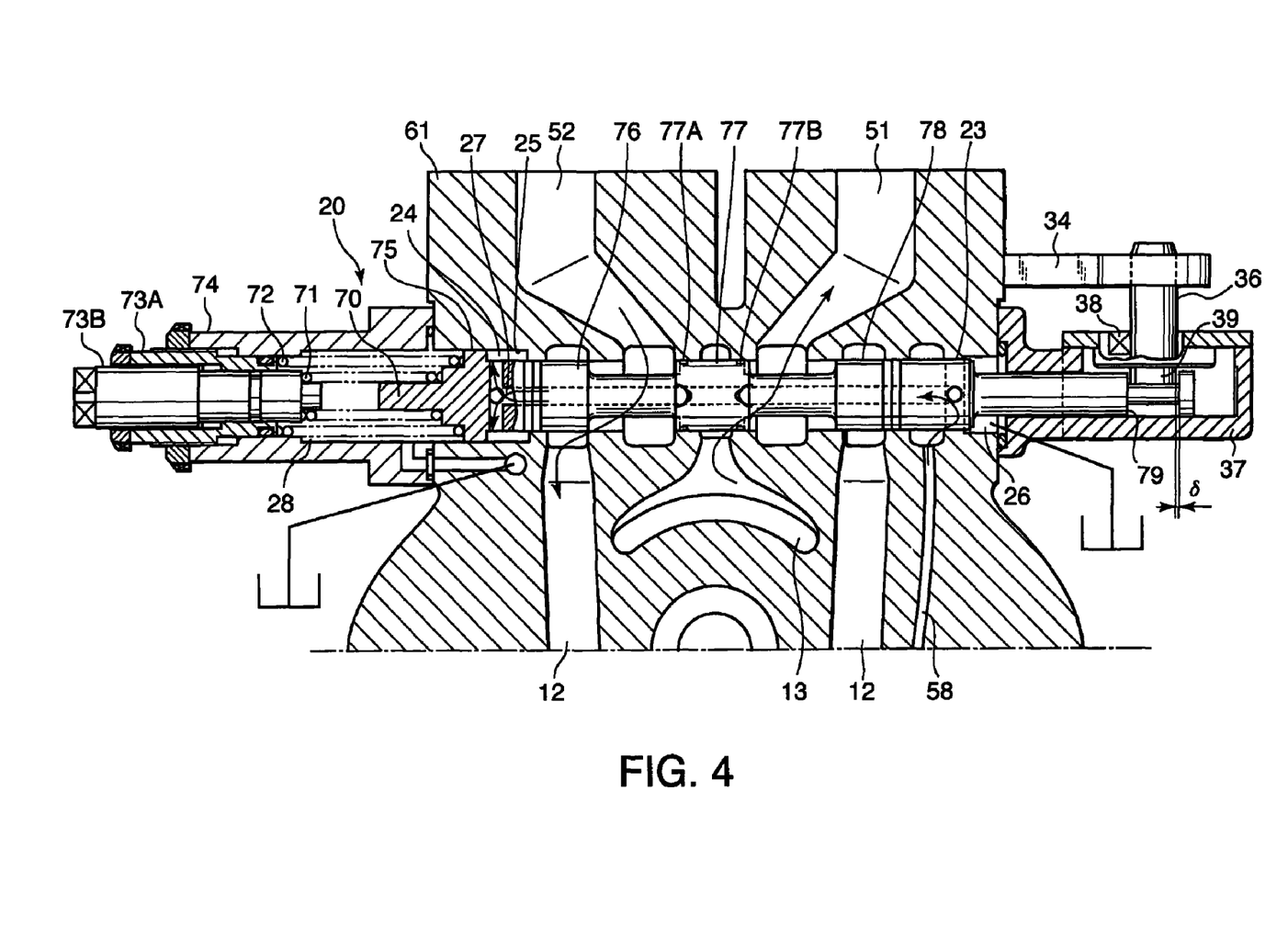
FIG. 4 is similar to FIG. 3, but shows the connection switch-over valve in a low-speed agitating section.

Referring to FIG. 4, the low-speed agitating section B corresponds to a position where the valve spool 70 is displaced a predetermined distance from the operation-stop section C shown in FIG. 3 in the left hand direction by an operation of the operating lever 34. In the low-speed agitating section B, pressurized working oil in the discharge passage 13 flows into the first hydraulic passage 51 via the notch 77B, and working oil in the second hydraulic passage 52 flows into the suction passage 12, as shown by the arrows in the figure. As a result, working oil recirculates from the first hydraulic passage 51 through the hydraulic motor 81 to the second hydraulic passage 52, and the hydraulic motor 81 rotates the agitating drum 1 in a direction for agitating ready-mixed concrete.

Figure 5:
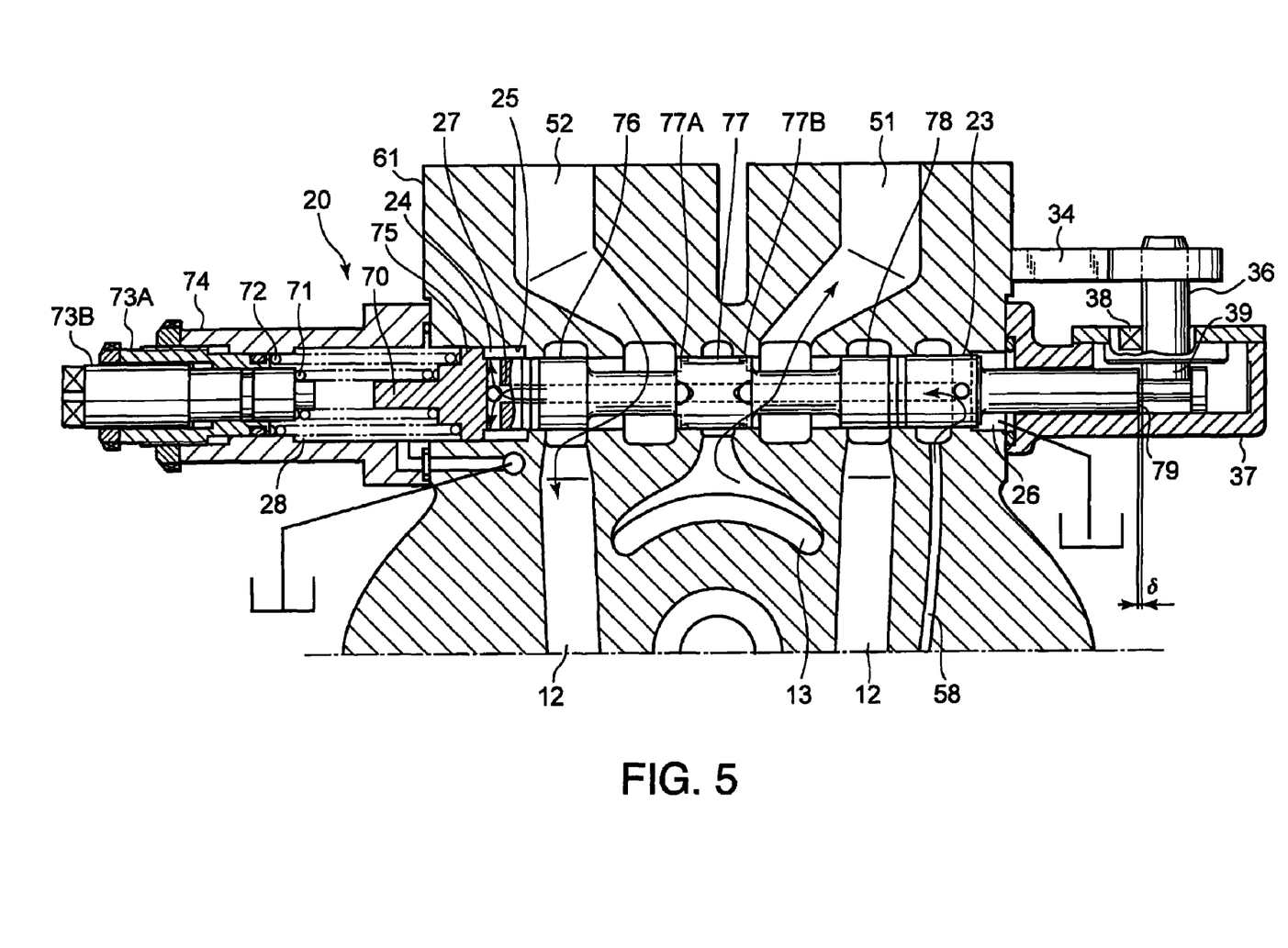
FIG. 5 is similar to FIG. 3, but shows the connection switch-over valve in a high-speed agitating section.

The flow directions of working oil in the connection switch-over valve 20 in the high-speed agitating section D shown in FIG. 5 are identical to those of the connection switch-over valve 20 in the low-speed agitating section B. In both of the agitating sections B and D, the pilot pressure chamber 24 communicates with the charging passage 58 via the axial hole 27.

In this connection switch-over valve 20, a gap δ is provided between the cam 39 and the annular groove 79. In the low-speed agitating section B shown in FIG. 4, as the valve spool 70 moves in the left hand direction within a range of the gap δ, an opening area of the notch 77B connecting the discharge passage 13 and the first hydraulic passage 51 increases, and as a result a pump discharge flow rate of the hydraulic pump 10 increases.

Figure 6:
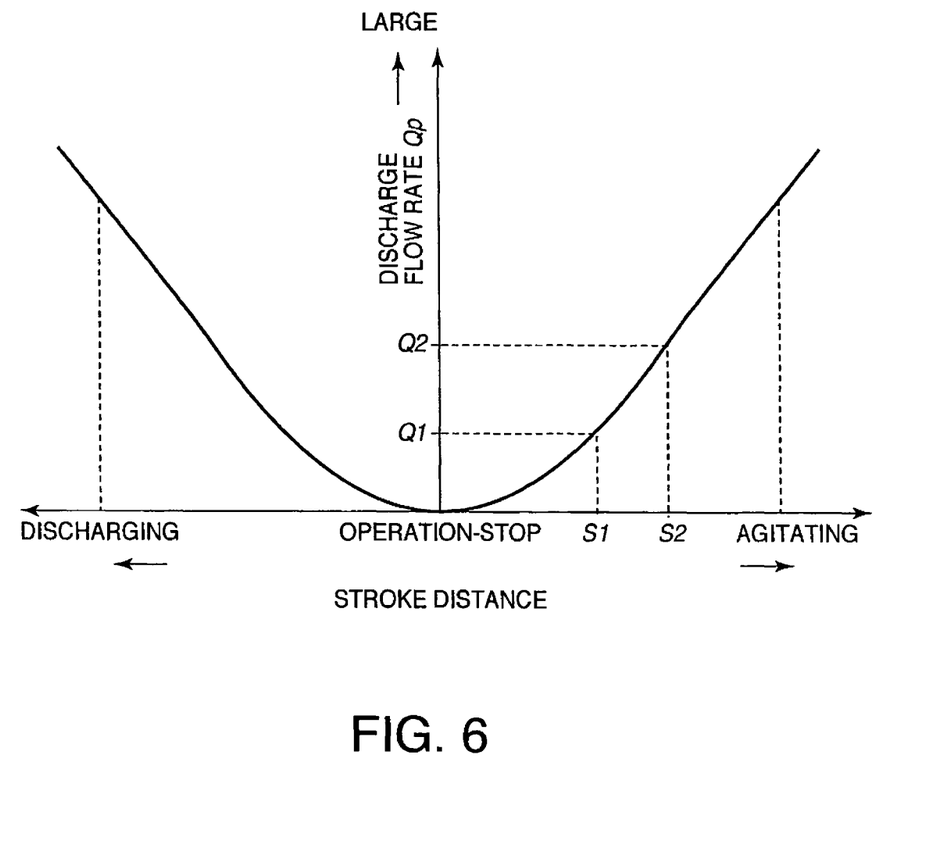
FIG. 6 is a diagram showing a characteristic of a pump discharge flow rate Qp with respect to a stroke distance of a valve spool in the connection switch-over valve.

Referring to FIG. 6, the relation between the stroke distance of the valve spool 70 in the agitating sections B and D, and a pump discharge flow rate Qp of the hydraulic pump 10 will be described. Assuming that the stroke distance is zero when the valve spool 70 is in the operation-stop section C, the pump discharge flow rate Qp increases as the stroke distance increases from zero in either of the right and left directions. When the valve spool 70 moves in the left hand direction from the operation-stop section C in FIG. 3 and the stroke distance reaches a value S1, shifting of the connection switch-over valve 20 to the low-speed agitating section B is complete. Further, when the stroke distance reaches a value S2, shifting of the connection switch-over valve 20 to the high-speed agitating section D is complete. The former shifting is performed manually via the operation lever 34 and the latter shifting is performed automatically depending on the discharge pressure of the charge pump 11. The gap δ is equal to a value S2-S1.

In the low-speed agitating section B shown in FIG. 4, as the rotation speed of the internal combustion engine 60 increases, the discharge pressure of the charge pump 11, which is driven in synchronization with the hydraulic pump 10 by the internal combustion engine 60, also increases. As a result, the pilot pressure in the pilot pressure chamber 24 which is introduced from the charging passage 58 via the axial hole 27 rises, and the valve spool 70 moves in the left hand direction in the figure. When this moving distance becomes equal to the gap δ, it means that the valve spool 70 has reached the high-speed agitating section D shown in FIG. 5.

When the operating lever 34 is operated to shift the connection switch-over valve 20 to the agitating section B in a state where the internal combustion engine 60 is running idle, the valve spool 70 is maintained in the low-speed agitating section B where the stroke distance of the valve spool 70 from the operation-stop section is equal to a value S1 as shown in FIG. 5.

Figure 9:
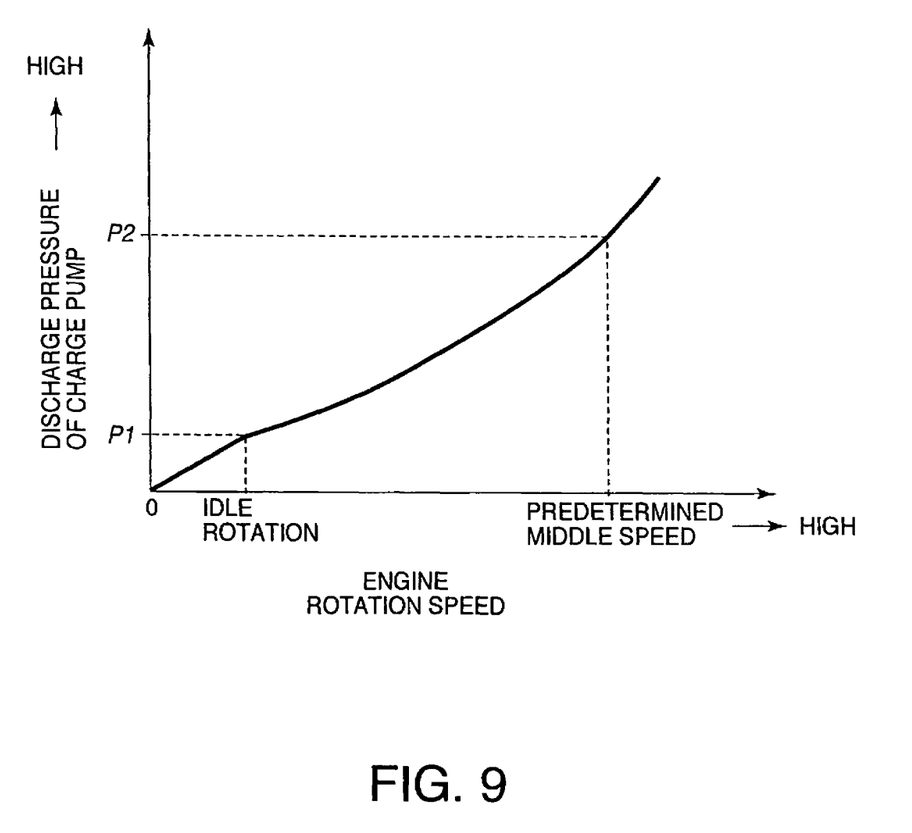
FIG. 9 is a diagram illustrating a charge pressure characteristic of the concrete agitating drum driving device.

When the internal combustion engine 60 is running idle, the pressure in the charging passage 58 is equal to a value P1 as shown in FIG. 9. This pressure P1 is led to the pilot pressure chamber 24 via the valve hole 23 and the axial hole 27 of the valve spool 70.

The screwed position of the second adjusting screw 73A into the casing 74 is adjusted in a state where the internal combustion engine 60 is running idle and the operation lever 34 is in the low-speed agitating section B. In this state, the screwed position of the second adjusting screw 73A into the casing 74 is determined such that the stroke distance of the valve spool 70 is equal to the value S1.

It should be noted that the gap δ is located on the right side of the cam 39 as in the case where the connection switch-over valve 20 is in the operation-stop section C.

When the engine rotation speed increases from the idle rotation speed, the pilot pressure in the pilot pressure chamber 24 increases from the value P1 to a value P2 as shown in FIG. 9. As a result, the valve spool 70 strokes from the low-speed agitating section B in FIG. 4 for a distance equal to the gap δ, and the cam 39 comes into contact with the other of the wall surfaces forming the annular groove 79 as shown the FIG. 5, and thereafter a further displacement of the valve spool 70 is prevented. This state corresponds to the high-speed agitating section D shown in FIG. 5.

As the valve spool 70 moves in the left hand direction in FIG. 4, the opening area of the notch 77B in the land portion 77 increases. As a result, the pump discharge flow rate Qp increases from Q1 to Q2 as shown in FIG. 6, and the rotation speed of the hydraulic motor 81 increases in response to an increase in the rotation speed of the internal combustion engine 60.

Even when the pilot pressure in the pilot pressure chamber 24 exceeds the value P2 as the engine rotation speed increases, the valve spool 70 does not stroke beyond the distance S2.

For this purpose, the screwed position of the first adjusting screw 73B into the second adjusting screw 73A is adjusted such that the stroke distance of the valve spool 70 becomes equal to the value S2 at a timing when the pilot pressure in the pilot pressure chamber 24 reaches the value P2.

Figure 7A:
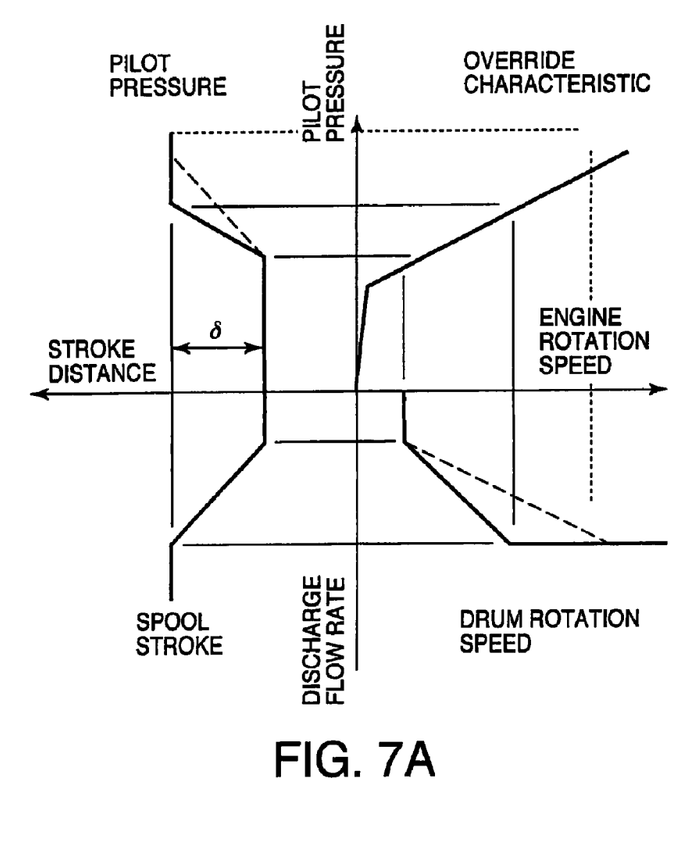
FIGS. 7A and 7B are diagrams showing a rotation speed characteristic of a concrete agitating drum when the connection switch-over valve is in the agitating section.
Figure 7B:
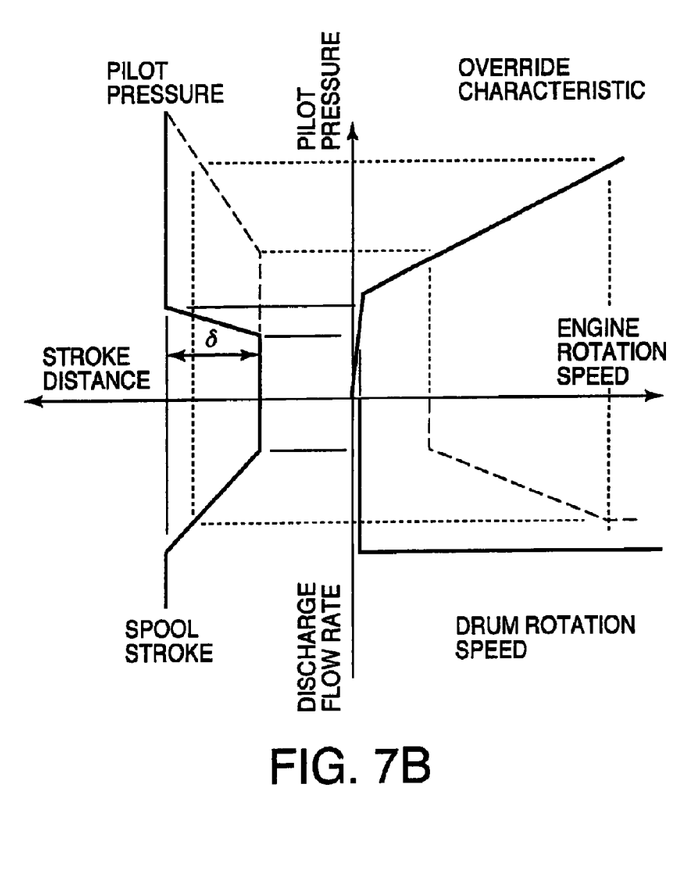

FIGS. 7A and 7B show the characteristics of the connection switch-over valve 20 in the agitating sections B or D.

In FIG. 7A, while the engine rotation speed increases from the idle rotation speed to a predetermined middle rotation speed, the valve spool 70 strokes for a distance corresponding to the gap δ, and the connection switch-over valve 20 shifts from the low-speed agitating section B to the high-speed agitating section D. Accordingly, the rotation speed of the agitating drum 1 increases gradually as the engine rotation speed increases from the idle rotation speed to the predetermined middle rotation speed. In other words, the spring characteristics of the first return spring 71 and the second return spring 72 are set so as to realize such a rotation speed characteristic of the agitating drum 1 with respect to an increase in the engine rotation speed.

The broken line in FIG. 7A shows that the engine rotation speed at which the connection switch-over valve 20 completes shifting to the high-speed agitating section D can be adjusted according to the spring characteristic settings of the first return spring 71 and the second return spring 72.

However, if the spring forces of the first return spring 71 and the second return spring 72 are excessively small, the valve spool 70 completes stroking for the distance corresponding to the gap δ and the connection switch-over valve 20 completes shifting to the high-speed agitating section D while the rotation speed of the internal combustion engine 60 remains in a region of the idle rotation speed, as shown by a solid line in FIG. 7B. In this case, the agitating drum 1 is rotated at the rated rotation speed or the normal operation speed while the internal combustion engine 60 is still running idle.

Therefore the output torque of the internal combustion engine 60 must be increased and hence the fuel consumption of the internal combustion engine 60 increases. In a case where the agitating section of the connection switch-over valve 20 comprises only the high-speed agitating section D without the low-speed agitating section B, the same characteristics appear as in the case where the spring forces of the first return spring 71 and the second return spring 72 are excessively small.

In contrast, in a case where the spring forces of the first return spring 71 and the second return spring 72 are excessively large, the valve spool 70 does not reach the high-speed agitating section D even when the engine rotation speed of the internal combustion engine 60 exceeds the predetermined middle rotation speed as shown by a broken line in FIG. 7B. In this case, the rotation speed of the agitating drum 1 does not reach the rated rotation speed or the normal rotation speed.

Next, free lengths of the first return spring 71 and the second return spring 72 will be described. As described above, in this connection switch-over valve 20, the second return spring 72 exerts a spring force on the valve spool 70 in the right hand direction in FIGS. 3-5 irrespective of the stroke position of the valve spool 70. The free length of the second return spring 72 is set such that the second return spring 72 exerts a spring force on the valve spool 70 even when it is in the discharge section A.

On the other hand, the free length of the first return spring 71 is determined to provide a clearance s between the valve spool 70 and a tip of the first return spring 71 when the valve spool 70 is in the operation-stop section C as shown in FIG. 3.

Figure 8:
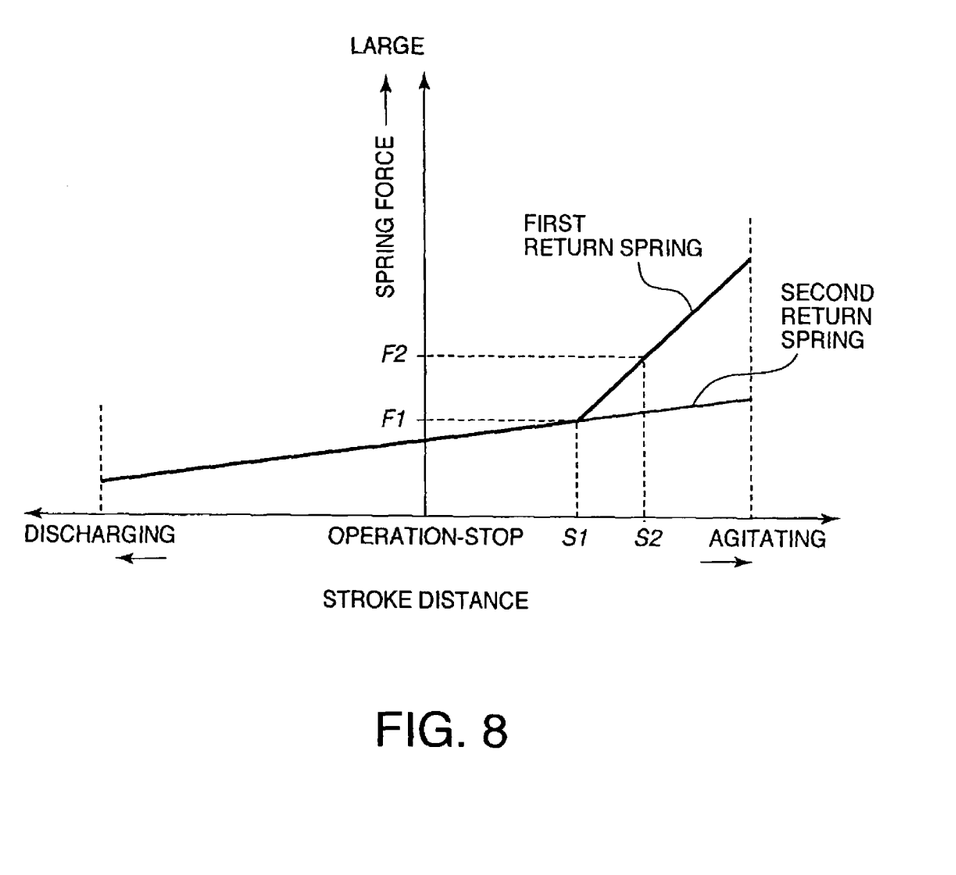
FIG. 8 is a diagram illustrating a relation between a stroke distance of the valve spool and a spring force exerted on the valve spool.

Referring to FIG. 8, by setting the free lengths of the first return spring 71 and the second return spring 72 in this manner, the relation between the stroke distance of the valve spool 70 and the spring force acting on the valve spool 70 varies at a point when the stroke distance equals the value S1. Herein, the value S1 corresponds to the position where the first return spring 71 comes into contact with the valve spool 70. When the valve spool 70 strokes towards the high-speed agitating section D beyond the value S1, the spring force acting on the valve spool 70 increases at a higher rate as the stroke distance increases than in a case where the stroke distance is less than the value S1.

As described above, according to this concrete agitating drum driving device, the connection switch-over valve 20 shifts from the low-speed agitating section B to the high-speed agitating section D as the engine rotation speed of the internal combustion engine 60 increases and the discharge pressure of the charge pump 11 increases accordingly, and the flow cross-sectional area of the pressurized working oil supplied to the hydraulic motor 8 is enlarged.

As a result, in a state where the engine rotation speed of the internal combustion engine 60 is in the idle rotation speed region or the low rotation speed region, the rotation speed of the agitating drum 1 is suppressed to be low, and the rotation speed of the agitating drum 1 increases to the rated rotation speed or the normal operation speed as the engine rotation speed of the internal combustion engine 60 increases to the predetermined middle rotation speed. It is therefore possible to decrease the fuel consumption amount of the internal combustion engine 60 when it operates in the idle rotation speed or the low rotation speed region as well as to decrease engine noise in these rotation speed regions.

According to this concrete agitating drum driving device, the valve spool 70 of the connection switch-over valve 20 displaces in response to the charging pressure led to the pilot pressure chamber 24 so as to vary the flow cross-sectional area of the pressurized working oil, and hence the above function is obtained without increasing the number of parts.

Further, according to this concrete agitating drum driving device, the valve spool 70 is supported by the first return spring 71 and the second return spring 72 such that the first return spring 71 can be used exclusively for setting a shifting characteristic between the low-speed agitating section B and the high-speed agitating section D. Accordingly, a preferable rotation characteristic of the concrete agitating drum 1 can be obtained easily.

In this concrete agitating drum driving device, since the discharge pressure of the charge pump 11 which varies in response to the engine rotation speed of the internal combustion engine 60 is exerted on the valve spool 70 as a pilot pressure, the rotation speed of the concrete agitating drum 1 responds to the engine rotation speed of the internal combustion engine 60 with a high degree of precision.

Figure 10:
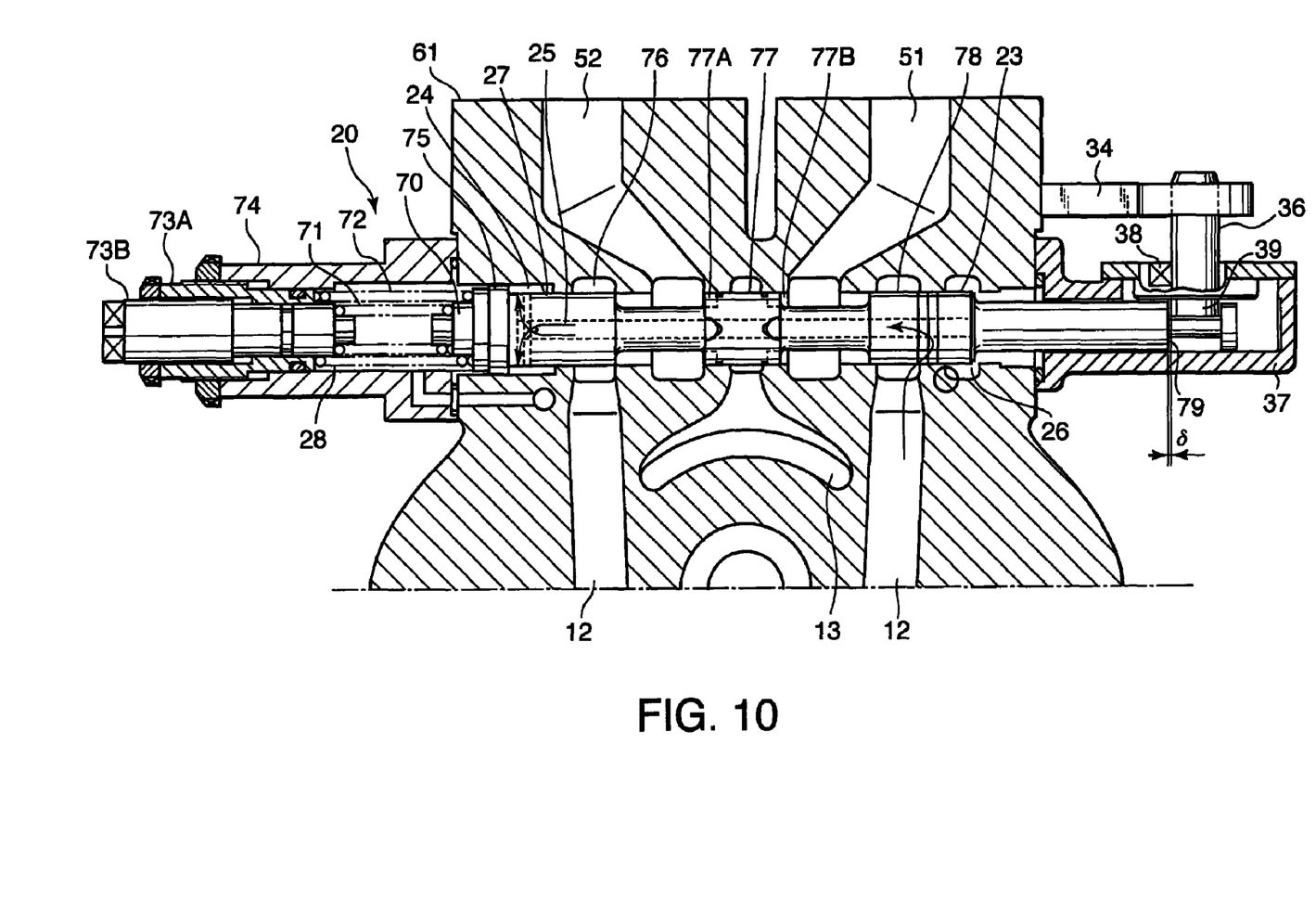
FIG. 10 is a longitudinal sectional view of a connection switch-over valve according to a further embodiment of this invention.

Referring to FIG. 10, a further embodiment of this invention related to the construction of the connection switch-over valve 20 will be described.

In this embodiment, the axial hole 27 formed in the valve spool 70 of the connection switch-over valve 20 is configured to connect the pilot pressure chamber 24 to the suction passage 12 in the low-speed agitating section B.

As shown in FIG. 1A, the charging passage 58 to which the charge pump 11 discharges working oil is connected to the suction passage 12 via the check valve 54. The pressure in the suction passage 12 for supplying working oil which is to be suctioned by the variable capacity hydraulic pump 10 is therefore almost equal to the discharge pressure of the charge pump 11.

In this embodiment, the pressure in the suction passage 12 is exerted on the valve spool 70 as the pilot pressure instead of the pressure in the charging passage 58.

The pressure in the suction passage 12 is almost equal to the discharge pressure of the charge pump 11. Therefore, likewise according to this configuration, the rotation speed of the concrete agitating drum 1 can be increased in response to the engine rotation speed of the internal combustion engine 60. According to this embodiment, it is not necessary to form the charging passage 58 in the pump cover 61, and hence the construction of the pump cover 61 is simpler than the first embodiment and the production cost of the concrete agitating drum driving device can be reduced.

The contents of Tokugan 2006-202092, with a filing date of Jul. 25, 2006 in Japan, are hereby incorporated by reference.

Although the invention has been described above with reference to certain embodiments of the invention, the invention is not limited to the embodiments described above. Modifications and variations of the embodiments described above will occur to those skilled in the art, within the scope of the claims.

For example, any combustion engine can be used as a drive source for the hydraulic pump 10 instead of the internal combustion engine 60.

INDUSTRIAL FIELD OF APPLICATION

As described above, this invention brings about a favorable effect in decreasing fuel consumption of a concrete agitating truck.

The embodiments of this invention in which an exclusive property or privilege is claimed are defined as follows:

The invention claimed is:

1. A concrete agitating drum driving device, comprising:
   a hydraulic motor mechanically connected to a concrete agitating drum;
   a variable capacity hydraulic pump driven by a combustion engine to drive the hydraulic motor to rotate by supplying pressurized working oil, the variable capacity hydraulic pump comprising a discharge passage to which the variable capacity hydraulic pump discharges the pressurized working oil which is to be supplied to the hydraulic motor;
   a mechanism which varies a capacity of the variable capacity hydraulic pump to maintain a pump discharge flow rate of the pressurized working oil discharged into the discharge passage by the variable capacity hydraulic pump constant;
   a charge pump which rotates in synchronization with the variable capacity hydraulic pump and discharges working oil which is to be suctioned by the variable capacity hydraulic pump; and
   a valve which narrows a flow cross-sectional area of the pressurized working oil supplied from the discharge passage to the hydraulic motor as a discharge pressure of the charge pump decreases.

2. The concrete agitating drum driving device as defined in claim 1, wherein the charge pump is constituted by a fixed capacity pump.

3. The concrete agitating drum driving device as defined in claim 2, wherein the valve is configured to maintain the flow cross-sectional area at a maximum value when the discharge pressure of the charge pump is higher than a pressure corresponding to a predetermined engine rotation speed which is higher than an idle rotation speed of the combustion engine.

4. The concrete agitating drum driving device as defined in claim 1, wherein the variable capacity hydraulic pump further comprises a suction passage, the concrete agitating drum driving device further comprises a first hydraulic passage and a second hydraulic passage for supplying the pressurized working oil in the discharge passage to the hydraulic motor while discharging a working oil discharged from the hydraulic motor to the suction passage, and the valve is constituted by a connection switch-over valve comprising a discharge section which connects the suction passage to the first hydraulic passage and connects the discharge passage to the second hydraulic passage, an agitating section which connects the suction passage to the second hydraulic passage and connects the discharge passage to the first hydraulic passage, and an operation-stop section which shuts off the first hydraulic passage and the second hydraulic passage from the suction passage and the discharge passage, wherein the flow cross-sectional area comprises a flow cross-sectional area between the discharge passage and the first hydraulic passage.

5. The concrete agitating drum driving device as defined in claim 4, wherein the connection switch-over valve comprises a valve spool for switching between the discharge section, the agitating section, and the operation-stop section, according to a stroke position thereof.

6. The concrete agitating drum driving device as defined in claim 5, wherein the agitating section comprises a high-speed agitating section which maintains the flow cross-sectional area at a predetermined area, and a low-speed agitating section which narrows the flow cross-sectional area from the predetermined area, and the connection switch-over valve comprises a spring which biases the valve spool in a direction from the high-speed agitating section towards the low-speed agitating section, and a pilot pressure chamber which applies the discharge pressure of the charge pump to the valve spool against a spring force of the spring.

7. The concrete agitating drum driving device as defined in claim 6, wherein the connection switch-over valve further comprises an operation lever which switches between the discharge section, the agitating section and the operation-stop section according to a manual operation thereof by an operator, and switching between the low-speed agitating section and the high-speed agitating section is performed in a state where the agitating section is selected by the operation lever.

8. The concrete agitating drum driving device as defined in claim 7, wherein the valve spool is allowed to displace within a predetermined range in a state where the operation lever is in the agitating section, and the low-speed, agitating section is realized when the valve spool is located at an end of the predetermined range while the high-speed agitating section is realized when the valve spool is located at another end of the predetermined range.

9. The concrete agitating drum driving device as defined in claim 6, wherein the spring is arranged to apply the spring force to the valve spool only when the valve spool is located in the agitating section, and the connection switch-over valve further comprises a second spring which applies a spring force to the valve spool in the same direction as the spring force of the first spring, irrespective of the stroke position of the valve spool.

10. The concrete agitating drum driving device as defined in claim 6, wherein the connection switch-over valve is integrated into a unit together with the variable capacity hydraulic pump.

11. The concrete agitating drum driving device as defined in claim 10, wherein the device further comprises a check valve which introduces the working oil discharged by the charge pump into the suction passage, and the pilot pressure chamber is connected to the suction passage.

12. The concrete agitating drum driving device as defined in claim 1, wherein the variable capacity hydraulic pump comprises a swash-plate pump which varies a discharge flow rate in response to a swash-plate angle of a swash-plate, and the mechanism comprises a high-pressure selector valve for extracting a load pressure of the hydraulic motor, a load sensing valve which generates an actuator driving pressure in accordance with a differential pressure between a pressure of the pressurized working oil in the discharge passage and the load pressure, and a hydraulic actuator which varies the swash-plate in response to the actuator driving pressure.

\* \* \* \* \*